3,455,848
POLYURETHANE FOAM-PRODUCING COMPOSITIONS COMPRISING MICROENCAPSULATED PARTICLES AND A METHOD OF MAKING FOAMS THEREFROM
Robert A. Yoncoskie, Arlington, Va., and Robert E. Kass, Dayton, John F. Hanny, West Carrollton, and John G. Whitaker, Union, Ohio, assignors to The National Cash Register Company, Dayton, Ohio, a corporation of Maryland
No Drawing. Filed May 5, 1964, Ser. No. 365,167
Int. Cl. C08g 22/44
U.S. Cl. 260—2.5                     14 Claims This invention relates to polyurethane foam-producing compositions and to a process for making foamed cellular materials which utilizes these compositions. More particularly, it relates to normally stable but potentially reactive, substantially homogeneous, self-contained polyurethane foam-producing systems in which minute particles, either solid or liquid, of at least one of the reactants which form the polyurethane itself and/or the foaming agent are encapsulated within an inert material. It further relates to polyurethane foam-forming compositions which are particularly advantageous for use at environmental pressures below atmospheric pressure. More specifically, it also relates to a new and improved process which utilizes these systems to produce polyurethane foamed structures.

Conventional polyurethane foams are condensation materials prepared from at least three basic ingredients: an organic polyol, an organic polyisocyanate, and a foaming or blowing agent. In a few cases, the polyol or the polyisocyanate has the additional function of acting as the blowing agent. Optionally, other materials such as catalysts, chain extenders, surfactants, etc., can be included.

Generally speaking, polyurethane foamed structures can be prepared in one of three different ways: the "one-shot," the "prepolymer," or the "quasi-prepolymer" method. In the "one-shot" technique, the basic ingredients, enumerated above, are mixed together and immediately polymerized and foamed. In the "prepolymer" technique, the polyol and the polyisocyanate are mixed in such proportions as to produce a polyurethane product which requires only the addition of a foaming agent and, in some cases, a chain extending or cross-linking agent. The "quasi- or semi-prepolymer" technique employs a reaction of the polyol and the polyisocyanate in which one or the other is used in excess, so that the resulting prepolymer contains an excess of reactive hydroxy or isocyanate groups. Foaming and further condensation occur upon addition of more polyol or polyisocyanate, depending upon the reactive groups present in the prepolymer.

Within recent years, the art of producing polyurethane foamed structures has become highly developed. This has resulted in a considerably broadened use of such foamed materials for a variety of purposes. An even wider and more extensive industrial application of these foamed materials within the near future is predicted. Many reasons account for the extremely fast growth in their use. For example, they are highly resistant to a large variety of chemical reagents, their density can be controlled easily, they can be readily varied from highly flexible to completely rigid, they retain their relatively high compressive strength even at lower densities, etc.

However, conventional polyurethane foam-producing systems have a limitation which restricts their wider application. Because of the highly reactive nature of their primary ingredients (that is, the polyol, the polyisocyanate, and, in some cases, the foaming agent) when mixed together, they must be physically separated to avoid reaction until immediately prior to the desired time and place of foam formation. Often even slightly prolonged premature periods of contact between, for example, the polyol and the polyisocyanate causes an undesirable reaction and consequent increase in the viscosity prior to the foaming itself, resulting in vastly inferior final foamed products. This necessitates the physical separation of the reactive ingredients, either in two distinct containers or in one container having between the ingredients a single barrier which can be ruptured to permit their contact and consequent reaction. The single container type of package has not produced entirely satisfactory foamed structures because of the lack of complete mixing of the ingredients prior to the beginning of the foaming reaction. even when two distinct containers of the reactive ingredients are used, thorough mixing is still a problem and is accomplished generally by the use of specialized, expensive, and complex metering and pumping apparatus.

Even with the aforementioned widespread commercial use of polyurethane foamed structures, little consideration has been given heretofore to the formation of such foamed structures under low-pressure environmental conditions. With the advent of man's penetration into outer space, there becomes manifest a need for such artificial space structures as, for example, space stations, shelters, solar energy collectors, etc. However, because of the limited weight and size requirements of structures propelled into outer space, at present the most feasible means of obtaining such structures is their formation in outer space itself. Space structures made by foaming polyurethanes in outer space present one solution of this vexing problem.

Obviously, in outer space it would be highly impractical to provide means to thoroughly mix polyurethane foam-forming materials obtained from separate containers. As a result of the low-pressure environment, the cell-forming gas generated by the foaming agent has a strong tendency to bubble off and escape prior to the formation of the requisite cellular structure.

Accordingly, it is an object of this invention to provide a normally stable, but potentially reactive, substantially homogeneous, self-contained system containing an intimate mixture of physically-separated polyurethane foam-producing reactants.

It is a further object to provide an intimate mixture of polyurethane foam-forming reactants containing minute encapsulated particles of at least one of the reactive ingredients.

Another object is to provide a single polyurethane foam-producing composition which is particularly advantageous at reduced pressures; that is, those below atmospheric pressure.

Still a further object is to provide a method of making polyurethane foamed structures by first forming a stable, but potentially reactive, substantially homogeneous, self-contained mixture of physically separated reactive polyurethane foam-producing ingredients and subsequently bringing the ingredients together into reactant contact by heating the mixture.

These and other objects of the invention will become apparent from the following description.

Broadly speaking, in accordance with the present invention, there have been developed normally stable, but potentially reactive, self-contained, substantially homogeneous polyurethane foam-producing compositions activated at will by applied heat. These compositions comprise complete, stable, single package or single mixture foaming systems containing all the required foam-producing ingredients intimately mixed together. The foaming systems include discrete minute particles, either solid or droplets or globules of liquid, hereinafter termed the internal phase or nuclei, of at least one of the reactive primary polyurethane foam-producing ingredients encapsulated or coated with an inert, impermeable, organic, film-forming, polymeric material (for example, ethyl cellulose) and substantially homogeneously interspersed among the other required solid or liquid components. Hereinafter, the term "reactive primary polyurethane foam-producing ingredients" is meant to include the polyol, the polyisocyanate, and the foaming agent. All of these materials are necessary components of a polyurethane foam-forming mixture, except in a relatively few compositions, in which the polyol or the polyisocyanate has the additional function of acting as the foaming agent.

Further, as another feature of the present invention, ther has been developed a process for producing polyurethane foamed structures which is unique in the formation of an intermediate stable, but potentially reactive, state comprising a single substantially homogeneous mixture of all the required polyurethane foam-producing ingredients, which subsequently can be easily and simply activated (for example, by heating) to initiate the final foaming reaction.

In general, the process comprises initially mixing minute particles of at least one of the primary reactive polyurethane foam-producing ingredients encapsulated in a non-reactive, organic, film-forming polymeric material which forms a protective wall around each nucleus until heated above a predetermined temperature, with the other solid or liquid ingredients until a substantially homogeneous mixture is obtained. Subsequently, the temperature of the resultant mixture is raised at will to effect release of the nucleus ingredient from the enveloping capsule walls. This permits contact of the reactive nucleus material with the other polyurethane foam-producing materials and initiates the exothermic foaming reaction, which continues to completion to produce the final foamed structure.

The provision of an intermediate polyurethane foam-producing mixture having discrete minute nuclei of at least one of the reactive ingredients isolated by an inert, organic, impermeable, polymeric, film-forming material effectively prevents physical contact of the components necessary to initiate the foaming reaction. However, and very importantly, this particular type of physical separation is of a nature to permit the intimate interspersion of the encapsulated material with the other ingredients at any time prior to the formation of the foam without endangering the quality of the final product by any slight premature reaction of the foam-producing ingredients. This eliminates any special premixing just prior to the formation of the form, generally heretofore required. The invention further provides a single, intimate, substantially homogeneous mixture of all the ingredients required in the foam-forming operation, thus insuring a complete, uniform foaming reaction throughout the entire mixture. The use of the complex special metering and pumping equipment usually required to mix and blend the polyurethane foam-producing ingredients prior to the forming reaction is eliminated, permitting the formation of foams in environments where such equipment is impractical to use.

The use of the polyurethane foam-producing mixture and process of this invention under such unfavorable conditions as, for example, the greatly reduced pressures found in an outer space environment is highly advantageous, particularly when chemical foaming agents (that is, compounds which generate the cell-forming gas in situ by reacting with another ingredient, or encapsulated foaming agents) are employed. A non-reactive, intimate, substantially homogeneous mixture of all the required foam-producing ingredients is made up, as aforedescribed, prior to its being placed in an environment of reduced pressure. Subsequently, when the foam-producing reaction is initiated, as aforedescribed, under reduced pressures, the cell-forming gas is liberated in situ throughout the mixture by the reaction of the chemical foaming agent with another ingredient in the mixture, or, in the case of encapsulated foaming agents, by their release from the capsules. This distributive entrapment of the cell-forming gas throughout the mixture greatly reduces the bubbling off and loss of the gas into the surrounding area of reduced pressure.

The components to be encapsulated with the inert, impermeable, polymeric film-forming materials can be any of the aforementioned reactive primary polyurethane form-producing ingredients known to the prior art, which, if physically separated from the other ingredients of the composition, would prevent initiation of the polyurethane foaming reaction. The term "reactive primary polyurethane foam-producing ingredients" is meant to include not only the monomeric or low-molecular-weight polyols, polyisocyanates, and foaming agents, but also the "prepolymers" and the "semi-prepolymers," which conventionally can be prepared prior to the final foam-forming step. Thus the polyol can be already combined in a prepolymer having an excess of isocyanate groups for reaction with a foaming agent such as water to generate the cell-forming gas.

Any of the wide variety of organic polyisocyanates disclosed in the prior art for producing polyurethane foams can be employed. In general, substantially any reactive organic diisocyanate, triisocyanate, higher functional polyisocyanate, or mixtures thereof, such as the isomeric mixtures normally obtained during the production of the polyisocyanates, are included. They can be of any configuration, such as aromatic, aliphatic, aralkyl, alicyclic, heterocyclic, etc. Illustrative of the various polyisocyanates are ethylene diisocyanate, hexamethylene diisocyanate, p- and m-phenylene diisocyanate, benzene 1:3:5-triisocyanate, toluene-2,4- and 2,6-diisocyanate, tolene - 2:4:6 - triisocyanate, monochlorobenzene-2:4:6-triisocyanate, triphenylmethane - 4:4′:4″ - triisocyanate, 3,3′-dimethyl diisocyanato-biphenyl, 3,3′-dimethoxy-4,4′-diisocyanato-biphenyl, 1,5-naphthalene diisocyanate, 1,4-cyclohexylene diisocyanate, 4:4′-diisocyanato-3-methyldiphenyl methane, chlorophenyl-2,4-diisocyanate, dianisidine diisocyanate, trimethylene diisothiocyanate, diphenylmethane diisothiocyanate, and the like.

The particular polyisocyanate selected for each individual polyurethane foam-producing mixture is, in general, dependent to a considerable extent on its reaction rate and the properties which it imparts to the final foamed product. For example, the use of a relatively slow-reacting aliphatic diisocyanate, such as hexamethylene diisocyanate, can be advantageous in preventing hardening of the polyurethane prior to the formation of good cell structure. Also, the careful selection of a polyisocyanate of particular functionality or a mixture of polyisocyanates (e.g., a di- and tri-functional isocyanate) and careful attention to the properties imparted by such isocyanates are advantageous in controlling the flexibility of the final foamed product. Because of the more numerous branching and cross-linking sites, generally the higher the functionality of the isocyanates employed, the more rigid is the final polyurethane foam. Factors, such as low cost and ease of handling, which are characteristic of the aromatic polyisocyanates such as the various toluene diisocyanate isomers, also determine to a great degree the selection of the particular isocyanate used. In addition, other properties such as volatility must also be considered. For example, methylene bis 4-phenyl isocyanate has a sufficiently high vapor pressure at reduced pressures of one millimeter of mercury or lower to partially volatilize and act as a blowing agent in addition to its usual reaction with a polyol to form the polyurethane structure.

Any organic polyol compound having a hydroxyl functionality of two or more per molecule (that is, two or more hydroxyl groups which will react with a polyisocyanate to form a urethane polymer) can be employed.

The polyol can be a compound such as glycerol, ethylene glycol, butylene glycol, trimethylolpropane, pentaerythritol, butanediol, sorbitol, 1,2,6-hexanetriol, N,N,N',N'-tetrakis-(2-hydroxypropyl) ethylene diamine (Quadrol), triethanol amine, and the like, or a higher molecular weight polymeric polyol such as a polyglycol, polyhydroxyl polyester, polyhydroxyl polyesteramide, polyhydroxyl polyether oil, and the like. A particularly preferred polyol is trimethylolpropane, a tri-functional polyhydroxy compound, which is a solid at room temperature but, upon being heated, becomes a liquid which is a solvent for or at least solvates certain encapsulating materials such as ethyl cellulose.

Illustrative of the polyglycols are polyalkylene glycols such as polyethylene glycol, polypropylene glycol, polybutylene glycol, and the like.

As examples of polyesters that can be used, there can be mentioned the reaction products of a dihydric alcohol such as ethylene glycol, diethylene glycol, tetraethylene glycol, 1,3-propylene glycol, dipropylene glycol, and the like, or a higher polyhydric alcohol such as glycerol, trimethylolethane, trimethylolpropane, pentaerythritol, mannitol, and the like, or mixtures of two or more of the alcohols, and a polycarboxylic acid or anhydride such as succinic, adipic, glutaric, malonic, sebacic, azelaic, phthalic, terephthalic, and isophthalic acids or their anhydrides. Mixtures of the acids and anhydrides can be employed.

The polyhydroxyl polyesteramides useful for the purposes of this invention can be any of those employed in the polyurethane foam art. Illustrative of these polymeric materials are the reaction products of a polyhydric alcohol, a dicarboxylic acid, examples of both of which have been mentioned above, and, as necessary, diamines or aminoalcohols such as ethylene diamine, hexamethylene diamine, phenylene diamine, benzidene, and monoethanolamine.

Illustrative of the polyhydroxy polyethers which can be employed are linear hydroxyl-containing polymers and copolymers of cyclic ethers such as ethylene oxide, epichlorohydrin, 1:2-propylene oxide, oxacyclobutane, and tetrahydrofuran or branched polyethers obtained from the condensation of the aforementioned ethers with branched polyhydroxy compounds such as glycerol, 1,1,1-trimethylolpropane, pentaerythritol, sorbitol, sucrose, and the like. Mixtures of linear and branched polyethers, or mixtures of polyesters and polyethers, can also be employed if desirable.

Other polyhydroxyl materials (for example, esters of hydroxy carboxylic acids, such as castor oil, glyceryl monoricinoleate, and the like), can also be used for the purposes of the present invention.

The ultimate selection of any polyol for each individual use depends upon a variety of factors such as its reactivity and the physical characteristics desired in the final foam product. A more flexible foam can be obtained by the use of a diol, while the more highly branched polyols of a hydroxyl functionality greater than two impart more rigid characteristics to the final foam product. Such properties as density, degree of flexibility, etc., can be controlled and varied to a great extent by employing mixtures of the polyols.

As aforementioned and as more fully disclosed in the prior art, in place of the above-enumerated polyols and polyisocyanates, there can be used semi-prepolymers obtained by the reaction of the polyols and polyisocyanates in which either is used in excess of the other, resulting in a product having either reactive isocyanate or reactive hydroxyl groups. Further reaction with additional polyol or polyisocyanate, depending on the reactive groups present in the semi-prepolymers, then takes place during the final foaming step. Also useful are the polyol-polyisocyanate prepolymers, which require only the addition of a foaming agent (for example, water) to produce the final polyurethane foam product.

Any conventional polyurethane foaming agent can be employed. Illustrative of these are water and the carboxylic acids, such as acetic, propionic, or lactic acids, all of which liberate $CO_2$ during the foam-forming reaction with the isocyanate groups. Additional suitable foaming agents are low-boiling compounds such as the Freons (e.g., trichlorofluoromethane and dichlorotetrafluoroethane) and compounds which decompose when subjected to heat; for example, azo bis-isobutyronitrile, diazoaminobenzene, 1,1' - azo - bis - (formamide), N,N'-dimethyl-N,N'-dinitro terephthalamide, benzene sulfonyl hydrazide, ammonium and sodium carbonate and bicarbonate, and the like. A particularly preferred foaming agent is sodium borohydride, which, when used in polyurethane foaming reactions, reacts with the hydroxyl groups of the polyol component to form hydrogen as the cell-forming gas, as more fully described and claimed in the copending U.S. patent application of Robert E. Kass, Ser. No. 365,166, filed of even date herewith, the disclosure of which is hereby incorporated by reference.

A wide variety of other conventional additives can be employed in the polyurethane foam-forming compositions. Illustrative of these additives are catalysts, such as the amines, preferably the tertiary amines, for example, triethylamine, triethylenediamine, N-methyl morpholine, pyridine, triethanolamine, dimethylaminoethanol, and the like; the tertiary phosphines, for example, triethyl and tripropyl phosphines, and the like; and metal salts, for example, stannous octoate, dibutyl tin dilaurate, sodium methyl siliconate, iron acetyl acetonate, cobalt naphthenate, zinc stearate, dibutyl tin oxide, sodium salicylate, and the like. Finely-divided materials, including pigments, dyestuffs, and fillers, such as silica gel, fuller's earth, metal powders, such as aluminum, calcium carbonate, carbon black, aluminum oxide, and the like; foam-controlling agents, for example, surfactants such as siliconeglycol copolymers, fire-retarding agents such as tri-($\beta$-chloroethyl) phosphate, emulsifying agents, thickening agents, etc., can also be added if desired.

The amounts of the aforementioned ingredients in the polyurethane foam-forming mixtures can vary over a wide range depending upon a variety of factors such as the reactivity of each of the components; the desired physical properties in the final cured foam product, for example, density, degree of flexibility or rigidity, and compressive strength; and the conditions under which the reaction occurs; e.g., pressure, temperature, etc. The amounts ultimately employed are disclosed in the prior art and can be easily determined by one skilled in the compounding of polyurethane foam-producing formulations.

The materials and processes employed to encapsulate the primary polyurethane foam-forming nucleus ingredients, that is, the polyols, polyisocyanates, or foaming agents, are well known and disclosed in the prior art. The encapsulation can be accomplished with any inert, insoluble, impermeable, organic, polymeric film-forming material which is deposited from a liquid suspension, usually colloidal in nature, or a liquid solution, onto a nucleus material, also suspended in a liquid, to form a capsule wall around the nucleus. By "inert" is meant that the polymeric material will not react with the nucleus material or any other ingredient in the polyurethane foam-producing mixture. By "insoluble" is meant that the polymeric material is neither dissolved by the nucleus material at the temperature at which the encapsulation is carried out nor dissolved by any other ingredient in the foam-producing mixture at the temperature at which the mixing is accomplished. However, in some cases the polymeric capsule wall can be imbibed, that is, dissolved, or at least solvated, by the nucleus material at an increased temperature, as will be described hereinafter in a preferred embodiment of the invention. By "impermeable" is meant that the polymeric material, in its final capsule wall form, will prevent both the passage of the internal phase out of the capsule and the entrance of any other ingredient in the external phase of the foam-producing mixture into the interior of the capsule until the release of the nucleus material is accomplished by melting, dissolving, or rupturing the capsule wall. The suitable encapsulating materials can be hydrophilic or hydrophobic, natural or synthetic, or crystalline or amorphous.

Illustrative of suitable materials employed in the making of the capsule walls are gelatin, albumen, alginates such as sodium alginate, casein, agar-agar, starch, pectin, ethyl cellulose, carboxy-methylcellulose, Irish moss, gum arabic, gum acacia, tristearin, cellulose acetate phthalate, amylose acetate phthalate, cellulose nitrate, polymethyl methacrylate, acrylonitrile-styrene copolymer, partially or completely hydrolyzed styrene-maleic anhydride copolymer, polystyrene, vinylidene-chloride-acrylonitrile copolymer, polyvinyl alcohol, polyvinyl acetals such as polyvinyl formal, and the like.

The encapsulation of the primary polyurethane foam-producing nucleus ingredients can be accomplished by a variety of convenient methods known to the prior art, the details of which are fully disclosed in existing patents or patent applications and in the specific examples appearing elsewhere herein. Illustrative of suitable methods employing polymeric film-forming materials having the required aforementioned properties are the ones disclosed in U.S. Patents No. 2,800,457, issued to Barrett K. Green and Lowell Schleicher on July 23, 1957, and No. 2,800,485, issued to Barrett K. Green on July 23, 1957, and reissued as U.S. Patent Re. 24,899 on Nov. 29, 1960; and in copending U.S. patent applications Serial Nos. 192,071 and 192,072, filed May 3, 1962, Ser. No. 192,072 being abandoned Sept. 26, 1964, by Thomas C. Powell et al., the disclosures of each of which are hereby incorporated by reference. Each of the encapsulating processes disclosed in the prior art can be summarized generally as comprising the separation of a suspended or dissolved polymeric, film-forming, encapsulating material from its suspension or solution and deposition of this material around minute particles, either solid or liquid, of a second suspended material, termed the "nucleus material." After the deposition is completed, the resulting capsules can be dried and isolated from the suspending medium by conventional techniques such as filtration, centrifugation, and the like. Alternatively, they can undergo subsequent treatments (for example, cross-linking or further polymerization) to harden the capsule walls and thereby impart to them greater durability and greater impermeability to the nucleus material and other ingredients in contact with the capsule wall. Each of the various processes disclosed in the prior art differs in some particulars; for example, the polymeric encapsulating material can be composed of one or more ingredients; the suspending media can comprise one or more liquids and other additional ingredients such as emulsifying agents, etc., the nucleus material can be liquid or solid, a solid suspended or dissolved in a liquid, or a mixture of two soilds; sequential capsule walls of the same or differing ingredients can be deposited onto the nucleus material, etc. These and other details, such as the concentration of the polymeric encapsulating material and the nucleus material in the suspending medium; the proportions of the materials employed; the various conditions under which the process is carried out, for example, the temperature; the rate of agitation of suspended materials; and other factors which can be varied depending upon the particular nucleus materials and polymeric encapsulating materials which it is desired to employ, the desired thickness of the capsule wall, the desired overall size of the capsular product, etc., are thoroughly described in the aforementioned U.S. patents and patent applications and elsewhere in the prior art and need not be repeated herein.

The capsules resulting from the aforedescribed processes are minute, hard, solid-like particles which are insoluble in the liquid components of the polyurethane foam-forming mixture at the temperature at which the mixture is produced. The size of the capsules can vary from about 2 microns to about 6,000 microns in diameter. The nucleus can be liquid or solid and usually composes about 40% to about 95% by weight of the total capsule. The capsules can be stored indefinitely or transported at temperatures below the melting point of the polymeric, film-forming material which forms the capsule wall.

As aforedescribed briefly, a further aspect of the present invention concerns the development of a process of producing polyurethane foamed structures. After the encapsulation or coating of minute nuclei of a reactive polyurethane foam-forming ingredient with an inert polymeric film-forming material which is impermeable to the passage of the encapsulated ingredient, the resulting capsules are mixed with the other foam-forming ingredients until a substantially homogeneous mixture is obtained. The mixing operation needs no special equipment and can be accomplished in any conventional manner, as with a Waring Blendor, by hand, etc. Although it is preferred in most cases just to mix the capsules with the additional ingredients, whether the ingredients be solid, liquid, or a combination of both, in some cases, if the resultant mixture is too viscous to obtain a substantially homogeneous mixture, a diluent or a low-viscosity liquid, for example, hexane or cyclohexane, which is a non-solvent for the polymeric film-forming wall material, can be employed. The diluent can be retained in the mixture or removed as desired after a substantially homogeneous mixture is obtained.

Subsequently, following either a relatively short or a prolonged period of time, the temperature of the inert, substantially homogeneous polyurethane foam-producing mixture is raised at will to a point at which the nucleus ingredient is released from the capsule. The increased temperature effects the release of the nucleus ingredient by melting, softening, or breaking the capsule wall, or, as preferred, by imbibing, which is meant to include solution or at least partial solvation of the capsule wall by the nucleus material. In each instance, the increase in temperature must not be so high as to degrade or otherwise impair the properties of the polyurethane reactants, which could result in inferior final foam products. The release of the reactive nucleus ingredient from the capsule permits its contact with the other reactive polyurethane foam-producing ingredients to initiate the foaming reaction, which, because of its exothermic nature, then continues to completion.

The various protective polymeric film-forming materials employed in the process, whether they be dissolved or melted, remain as inert material in the final polyurethane foam product. Since they are non-reactive and form such a small percentage of the total mixture, they do not interfere substantially with the desired properties of the final foam product.

The amount of each ingredient employed in the process will, of course, depend upon a variety of considerations such as the particular kinds of ingredients used in the foam-producing mixture, the conditions, for example, temperature and pressure, under which the foaming is carried out, the desired final physical properties of the foamed structure, and like parameters. In calculating the amount of each reactive encapsulated ingredient, it is only necessary to allow for that portion which includes the inert capsule wall.

The process can be employed over a wide range of temperatures and pressures. It is only necessary that the temperature remain below the point at which release of the nucleus material occurs, until the desired time to initiate the foaming reaction.

The polyurethane foamed structures produced by the aforedescribed process are uniform multi-celled structures having a wide range in their final physical properties. The foamed structures can vary from flexible through semi-flexible to rigid, depending upon the ultimate utilization of each individual foamed product. Other properties, such as density, can also be controlled during the foam production to give final cellular products varying from between about two pounds per cubic foot to about twenty-five pounds per cubic foot.

As a special embodiment of the mixtures and the process of the present invention, it is preferred to employ, as the reactive nucleus, a polyurethane foam-producing reactant, for example, a polyol such as trimethylolpropane, and, as the encapsulating material, an inert, impermeable, polymeric film-forming material such as ethyl cellulose. The trimethylpropane, which has a melting point of 58 degrees centigrade, is a solid at room temperature and in its solid state is easily encapsulated, using ethyl cellulose, as hereinafter described in Examples 1 through 3. When the temperature of the capsule is raised above the melting point of the trimethylpropane, the latter liquefies and imbibes, that is, dissolves, or at least swells or solvates, the ethyl cellulose capsule wall sufficiently to release the trimethylolpropane from the capsule. As the trimethylolpropane is released, it contacts the other polyurethane foam-producing ingredients required to initiate the final polyurethane producing reaction and the foaming reaction. The two reactions then continue simultaneously until the final foam product is completely formed.

In this preferred embodiment, the amount of heat usually required to obtain release of the nucleus material by melting the capsule wall is greatly reduced. Since the melting point of the trimethylolpropane, 58 degrees centigrade, is considerably lower than that of the ethyl cellulose, it is necessary only to raise the temperature of the capsule somewhat above the 58 degrees centigrade to secure release of the trimethylolpropane through the ethyl cellulose wall. Such a reduction in heat requirements is particularly advantageous under adverse conditions such as in outer space, where the transportation of large heating units is highly impractical.

The following examples illustrate the use of encapsulated trimethylolpropane in the inert, single mixture, substantially homogeneous polyurethane foam-producing systems and in the process of this invention, but are not to be construed as in any way limiting the invention.

EXAMPLE 1

A solid polyol, trimethylolpropane, was pulverized in a Waring Blendor and passed through a 25 mesh screen (U.S. Sieve Series). 25 grams of ethyl cellulose was added to 1,225 grams of toluene to obtain a 2% ethyl cellulose solution, which was then cooled to 18 degrees centigrade. The ethyl cellulose had an ethoxyl content of 47.5% by weight and a viscosity grade of 22 centipoises when dispersed dry in a 5% concentration by weight in an 80/20 toluene-ethanol bath at 25 degrees centigrade. With constant stirring, 100 grams of the ground trimethylolpropane was dispersed in the cooled ethyl-cellulose-toluene solution. To phase out the ethyl cellulose, sufficient liquid polybutadiene having a molecular weight of about 8,000 to 10,000 was added slowly to the resulting dispersion with continued stirring. As the ethyl cellulose came out of solution, it deposited around the solid trimethylol propane nucleus particles to form the capsule walls. The capsules were hardened by washing with petroleum distillate No. 1 to remove the excess toluene solvent, vacuum dried, and then air dried. The petroleum distillate No. 1 was a low-boiling liquid solvent comprising predominantly saturated aliphatic and aromatic hydrocarbons of about 4 to 14 carbon atoms and having an aniline point of 140 degrees Fahrenheit (ASTM D-611), an initial boiling point during distillation of between 140 and 150 degrees Fahrenheit, and an end boiling point of 215 degrees Fahrenheit. The final capsules contained about 80% by weight trimethylolpropane and about 20% by weight ethyl cellulose and measured about 200 to 800 microns in diameter.

The resulting capsules were then blended with the following ingredients in the indicated proportions:

| Composition: | Parts by wt., grams |
|---|---|
| Polymethylene polyphenylisocyanate [1] | 200 |
| Powdered mixture of 92.5% sodium borohydride and 7.5% cobalt chloride (100 mesh—U.S. Sieve Series) | 17.8 |
| Trimethylolpropane capsules | 83.5 |

[1] A polyfunctional isocyanate, produced by the reaction of aniline and formaldehyde, followed by phosgenation, having the formula

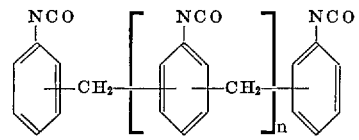

in which $n$ varies from 0 to 3.

The powdered mixture of sodium borohydride and cobalt chloride was stirred with the liquid polyisocyanate followed by addition of the capsules to form a final substantially homogeneous flowable one package system.

The resulting flowable mixture was poured into an open vessel and subjected to reduced pressures of the order of $10^{-4}$ millimeters of mercury for a period of several hours. The mixture remained inert throughout this period.

Under one millimeter of mercury pressure, the inert mixture was then supplied with sufficient heat to melt the trimethylolpropane, effect its release from the capsules by solvation or solution of the ethyl cellulose capsule walls, and initiate the foaming reaction. The cobalt chloride catalyzed the in situ formation of the cell-forming hydrogen gas produced by the reaction of the trimethylolpropane and the sodium borohydride. The reaction produced 2,150 cc. of a rigid polyurethane foam having a density of 8.8 pounds per cubic foot and a flexural strength of 97.7 p.s.i., as determined on the Tinius-Olsen testing machine.

EXAMPLE 2

In order to show that the formulation of Example 1 can be foamed at atmospheric pressure, the following mixture was obtained using the same procedures and ingredients:

| Composition: | Parts by weight, grams |
|---|---|
| Polymethylenne polyphenylisocyanate | 60 |
| Mixture of sodium borohydride and cobalt chloride | 6 |
| Trimethylolpropane capsules | 25 |

Sufficient heat was supplied to initiate the foaming reaction at atmospheric pressure, resulting in a strong, rigid foam having a density of 11 pounds per cubic foot.

EXAMPLE 3

A finely-ground mixture of 6.25 grams of trimethylolpropane and 4 grams of ammonium carbonate, a blowing agent, was dispersed in 250 grams of a 2% ethyl cellulose-toluene solution. Using the procedure of Example 1, the ethyl cellulose was phased out with about 140 grams of the liquid polybutadiene of Example 1 to form capsules having 66% by weight of an internal phase of trimethylolpropane and ammonium carbonate and 34% by weight of the ethyl cellulose wall material.

The resulting capsules were then added to the following formulation in the indicated proportions:

| Composition: | Parts by weight, grams |
|---|---|
| Polymethylene polyphenylisocyanate | 18.3 |
| Trimethylolpropane-ammonium carbonate capsules | 13.2 |
| Dibutyl tin dilaurate | .5 |

After several hours, the resulting mixture was heated in a vacuum at one millimeter of mercury pressure until the foaming reaction was initiated. 160 cc. of a polyurethane foam having a density of 12.5 pounds per cubic foot was obtained.

As will be apparent to those skilled in the art, various other modifications can be carried out from the above disclosure without departing from the spirit and scope of the invention embodied within the claims.

What is claimed is:

1. A stable, potentially reactive, self-contained, substantially homogeneous polyurethane foam-producing composition comprising an organic polyisocyanate, an organic polyol, and a sodium borohydride foaming agent, each of a plurality of discrete minute particles of all of at least said organic polyol forming the nucleus of a minute capsule having an inert, impermeable, polymeric, film-forming wall material which prevents contact between the nucleus material and any remaining non-encapsulated ingredients in the composition, said ingredients being non-reactive in the absence of contact with said nucleus material, said wall material being insoluble in said nucleus material and said remaining ingredients at the temperature at whch the composition is produced, and said organic polyol being a solid at the temperature at which the composition is produced, melting at a temperature lower than the melting temperature of the wall material with which it is encapsulated, and in its melted state, imbibing said wall material sufficiently to effect its release through the wall material.

2. The composition of claim 1 which additionally contains cobalt chloride.

3. The composition of claim 1 in which all the foaming agent is additionally encapsulated.

4. The composition of claim 1 in which all the organic polyisocyanate is additionally encapsulated.

5. The composition of claim 1 in which the organic polyol is a solid at room temperature.

6. The composition of claim 5 in which the organic polyol is trimethylolpropane.

7. The composition of claim 6 in which the wall material is ethyl cellulose.

8. A method of making a polyurethane foamed structure comprising preparing a stable, potentially reactive, self-contained, substantially homogeneous composition comprising an organic polyisocyanate, an organic polyol, and a sodium borohydride foaming agent by mixing a plurality of discrete minute particles of all of at least said organic polyol encapsulated with an inert, impermeable, polymeric, film-forming wall material to form a plurality of minute capsules comprising said particles as nucleus material with any remaining non-encapsulated ingredients of said composition, said wall material preventing contact between said nucleus material and said remaining ingredients and being insoluble in said nucleus material and said remaining ingredients at the temperature of said mixing, the said remaining ingredients being non-reactive in the absence of contact with said nucleus material, said organic polyol being a solid at the temperature of said mixing, melting at a temperature lower than the melting temperature of the wall material with which it is encapsulated, and in its melted state, imbibing said wall material sufficiently to effect its release through the wall material, and subsequently at will raising the temperature of said composition sufficiently to effect release of said nucleus material from said capsules to initiate the final foam-producing reaction, said temperature being raised at least above the melting point of said organic polyol.

9. The process of claim 8 in which the ingredients of said composition include cobalt chloride.

10. The process of claim 8 in which all the foaming agent is additionally encapsulated.

11. The process of claim 8 in which all the organic polyisocyanate is additionally encapsulated.

12. The process of claim 8 in which the organic polyol is a solid at room temperature.

13. The process of claim 12 in which the organic polyol is trimethylolpropane.

14. The process of claim 13 in which the wall material is ethyl cellulose.

References Cited

UNITED STATES PATENTS

| | | | |
|---|---|---|---|
| 2,800,458 | 7/1957 | Green | 252—316 |
| 2,800,457 | 7/1957 | Green | 252—316 |
| 3,051,665 | 8/1962 | Wismer et al. | 260—2.5 |
| 3,138,563 | 6/1964 | Morgan et al. | 260—2.5 |
| 3,161,602 | 12/1964 | Herbiz et al. | 260—77.5 |
| Re. 24,899 | 11/1960 | Herbiz et al. | 260—77.5 |
| 2,909,493 | 10/1959 | Bush | 260—2.5 |
| 3,072,582 | 1/1963 | Frost | 260—2.5 |
| 3,084,127 | 4/1963 | Vakonsky | 260—2.5 |

FOREIGN PATENTS

| | | |
|---|---|---|
| 1,186,828 | 2/1965 | Germany. |
| 1,304,960 | 8/1962 | France. |
| 882,738 | 11/1961 | Great Britain. |
| 983,215 | 2/1965 | Great Britain. |

OTHER REFERENCES

Phillips et al., Polyurethanes, 1964, pp. 1–9 relied upon.

DONALD E. CZAJA, Primary Examiner

M. J. WELSH, Assistant Examiner

U.S. Cl. X.R.

117—100; 252—316; 260—77.5